(12) United States Patent
Samson et al.

(10) Patent No.: US 8,437,062 B1
(45) Date of Patent: May 7, 2013

(54) ELECTROSTATICALLY-ADDRESSED MEMS ARRAY SYSTEM AND METHOD OF USE

(75) Inventors: Scott Samson, Safety Harbor, FL (US); Sunny Kedia, Largo, FL (US); Vandana Upadhyay, Atlanta, GA (US); Rahul Agarwal, Clearwater, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 13/446,248

(22) Filed: Apr. 13, 2012

Related U.S. Application Data (62) Division of application No. 12/057,915, filed on Mar. 28, 2008, now Pat. No. 8,179,581.

(60) Provisional application No. 60/908,474, filed on Mar. 28, 2007.

(51) Int. Cl.
*G02B 26/08* (2006.01)

(52) U.S. Cl.
USPC .................. 359/200.6; 359/199.2; 359/224.1

(58) Field of Classification Search .... 359/198.1–199.2, 359/200.6, 212.1, 213.1–214.1, 223.1–226.2; 310/309
See application file for complete search history.

(56) References Cited

U.S. PATENT DOCUMENTS 7,006,276 B2 * 2/2006 Starkweather et al. ....... 359/290

OTHER PUBLICATIONS

S. Samson, R. Agarwal, S. Kedia, W. Wang, S. Onishi, and J. Bumgarner, "Fabrication processes for packaged optical MEMS devices," Proc. ICMENS 2005 Banff, Alberta, Canada, p. 113-118, 2005.
E. Wagner, B. Smith, S. Madden, J. Winefordner, and M. Mignardi, "Construction and evaluation of a visible spectrometer using digital micromirror spatial light modulation," Applied Spectroscopy, v. 49, No. 11, p. 1715-1719, 1995.
K.I. Tarasov, The Spectroscope, New York: John Wiley & Sons, p. 77-81, 1974.
S. Kedia, S. Samson, A. Farmer, M. C. Smith, D. Fries, S. Bhansali, "Handheld interface for miniature sensors," SPIE International Symposium of Smart Materials, Nano- and Micro-Smart Systems v. 5649 p. 241-252, 2004.
D. Lopez, F. Pardo, V. Aksyuk, M. Simon, H.Shea, D. Marom, D. Neilson, R. Cirelli, F. Klemens, W. Mansfield, L. Fetter, E. Bower, J. Miner, and T. Sorsch, "MEMS mirror array for a wavelength selective 1xK switch," Proc. SPIE Smart Sensor, Actuators, and MEMS, v. 5116 p. 445-455 2003.

* cited by examiner

*Primary Examiner* — James Phan
(74) *Attorney, Agent, or Firm* — Molly L. Sauter; Smith & Hopen, P.A.

(57) ABSTRACT

The present invention provides an improved electrostatic micro actuator array system comprising a plurality of electrostatic micro actuators, each of the micro actuators further comprising at least one hold-down electrode and at least two pull-down electrodes positioned to actuate the micro actuator. A hold-down signal line is then coupled to each of the hold-down electrodes of each of the plurality of micro actuators and a plurality of first pull-down signal lines coupled to one of the at least two pull-down electrodes of each micro actuator and a plurality of second pull-down signal lines coupled to another of the at least two pull-down electrodes of each micro actuator, the first pull-down signal lines and the second pull-down signal lines configured in a cross-point matrix such that a unique pair of first pull-down signal lines and second pull-down signal lines is associated with each of the plurality of micro actuators.

8 Claims, 5 Drawing Sheets

ELECTROSTATICALLY-ADDRESSED MEMS ARRAY SYSTEM AND METHOD OF USE

CROSS-REFERENCE TO RELATED APPLICATIONS

The application claims priority to U.S. patent application Ser. No. 12/057,915, filed on Mar. 28, 2008, entitled, "Electrostatically-addressed MEMS Array System and Method of Use", now U.S. Pat. No. 8,179,581, which claims priority to U.S. Provisional Patent Application No. 60/908,474, filed on Mar. 28, 2007, entitled, "Electrostatically-Addressed MEMS Array".

STATEMENT OF GOVERNMENT INTEREST

This invention was made with Government support under Grant No. DASG60-00-C-0089 awarded by the US Army Space and Missile Defense Command. The Government has certain rights in the invention.

BACKGROUND

Figure 1A:
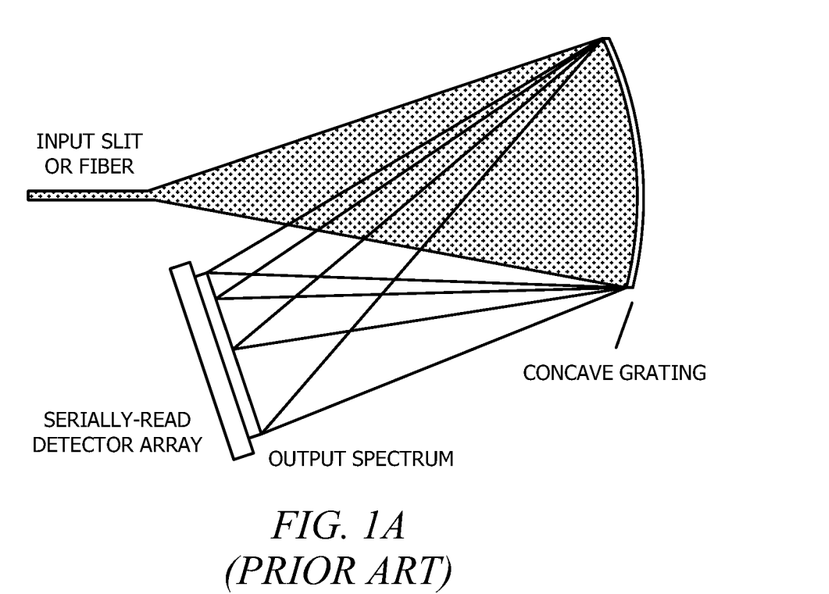
FIG. 1 is an illustration showing a comparison of a prior art (A) traditional detector-array based spectrometer and a prior art (B) mirror array and detector based spectrometer.

Measuring the intensity of the light passing through a medium at specific wavelengths, one can determine the presence and concentration of various chemical and biological components. Absorption can be caused by a chemical reaction with an added reagent or by direct absorption by the molecules. Fluorescence can also be a powerful analytical tool, especially in biological detection. Dispersing the light into spectral components in a spectrograph, and then detecting the wavelengths of interest using an array of photodetectors can determine the intensities at specific wavelengths of interest. Commercial spectrometers using this principle are widely available in the visible range, largely due to the availability of chemical reagents, and inexpensive arrayed photodetectors (primarily charge coupled device (CCD) arrays). A schematic of a traditional detector array-based spectrometer is shown in with reference to FIG. 1A. In the infrared spectral regions, photodetector arrays are more costly and prone to thermal noise. To reduce cost or improve sensitivity, several other techniques have found use in commercial instruments. These include Hadamard Transform Spectrometers, Fourier Transform Spectrometers, and monochromators. Both Hadamard and Fourier transform spectrometers require longer measurement times and computing power in exchange for improved sensitivity. The monochromators use mechanically scanned slits or gratings to measure a single frequency at a time; measurement of a variable passband width would require changing slits, and measurement of noncontiguous wavelength bands is not practical. Often analytical techniques can benefit from instantaneous or time-resolved measurements, making serially read detector arrays and the aforementioned time-integrated techniques less relevant.

Figure 1B:
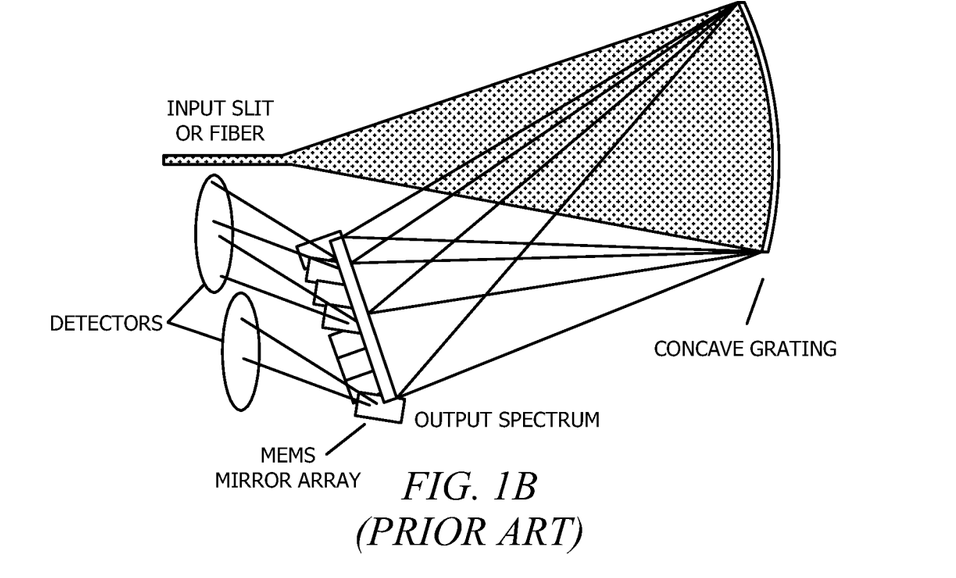

In a different type of spectrometer, one can use a programmable mirror array to direct only the desired wavelengths onto a single detector. MEMS mirrors can allow rapid reconfiguration of the desired spectral passbands, and the detector may be selected based on cost, sensitivity, response speed requirements, etc. This layout would be especially useful in industrial, consumer, and military applications where an instrument is needed to make repeated measurements (e.g. absorption at a specific wavelength) of fixed spectral bands, while allowing fast and re-programmable configuration. Such a system is illustrated in FIG. 1B. The benefit of this type of spectrometer is that only the wavelengths of interest are measured, and since the number of detectors is reduced, it can be a more specialized type. For example, a fast sensitive detector could be used to provide time-resolved fluorescence measurements.

One of the primary challenges for making such a system is a reconfigurable micromirror array capable of deflecting incident light onto or away from a detector. Accordingly, what is needed in the art is an improved system and method for the control of a MEMS-fabricated electrostatic array.

SUMMARY

The present invention provides an improved electrostatic micro actuator array system comprising a plurality of electrostatic micro actuators, each of the micro actuators further comprising at least one hold-down electrode and at least two pull-down electrodes positioned to actuate the micro actuator. A hold-down signal line is then coupled to each of the hold-down electrodes of each of the plurality of micro actuators and a plurality of first pull-down signal lines coupled to one of the at least two pull-down electrodes of each micro actuator and a plurality of second pull-down signal lines coupled to another of the at least two pull-down electrodes of each micro actuator, the first pull-down signal lines and the second pull-down signal lines configured in a cross-point matrix such that a unique pair of first pull-down signal lines and second pull-down signal lines is associated with each of the plurality of micro actuators.

In an additional embodiment, the present invention provides a method for reducing the number of electrostatic drive lines required for the configuration of an array of electrostatic micro actuators. In one embodiment, each of the micro actuators further includes at least one hold-down electrode and at least two pull-down electrodes positioned to actuate the micro actuator. The method of the present invention includes the steps of positioning a hold-down signal line coupled to each of the hold-down electrodes of each of the plurality of micro actuators, positioning a plurality of first pull-down signal lines coupled to one of the at least two pull-down electrodes and a plurality of second pull-down signal lines coupled to another of the at least two pull-down electrodes, the first pull-down signal lines and the second pull-down signal lines configured in a cross-point matrix such that a unique pair of first pull-down signal lines and second pull-down signal lines is associated each of the plurality of micro actuators, applying a voltage to the hold-down signal line, applying a voltage to the unique pair of first pull-down signal lines and second pull-down signals for one of the plurality of micro actuators such that the summation of the voltages on the hold-down signal line and the at least two pull-down signal lines is sufficient to actuate the micro actuator to a pulled-down state and removing the voltage on the at least two pull-down electrodes while maintaining the voltage on the hold-down electrode to hold the micro actuator in the pulled-down state.

In a particular embodiment of the present invention, a reconfigurable microelectromechanical (MEMS) micromirror array system capable of deflecting incident light onto or away from a detector is provided. The micromirror array of the present invention includes a plurality of cantilever-mirror elements and each cantilever-mirror element includes an electrostatically actuated cantilever, a mirror coupled to the electrostatically actuated cantilever through at least one hinge element, a hold-down electrode positioned underneath the cantilever, and at least two pull-down electrodes positioned underneath the cantilever. With this embodiment, a reduced number of drive lines can be used to configure the mirrors of the array as previously described.

The present invention describes the design and control of MEMS-fabricated electrostatic arrays. The MEMS structures can be fabricated using any number of surface micromachining processes, of which one possibility is described. A multiplexing method is introduced in the design to enable positioning a large number of devices from a few electrical inputs, which is necessary for practical applications when integrated control circuitry cannot be created on-chip with the MEMS devices. This approach also enables separate optimization of the actuation and control sections, and significantly reduces the number of drive signals required.

The present invention addresses the problem of realistically addressing large arrays of electrostatically-actuated MEMS structures. The method reduces the need for high-density wiring and custom application specific integrated circuitry (ASICs) to be integrated into the MEMS processing, either through monolithic or flip-chip assembly techniques, by reducing the number of actuation signals required.

In a particular embodiment, an application in an optical spectrometer instrument is illustrated. Toward reducing the cost, size and complexity of the mirror arrays needed, the design, fabrication, and control of a MEMS-actuated mirror array that can be coupled with a conventional or MEMS-fabricated spectrograph and one or two photodetectors for spectrometry detection applications is presented. The surface micromachined parts need not lie in a line, so they could be efficiently matched with the output spectrum of spectrographs without flat-field correction. In addition to the spectrometer applications, the reconfigurable mirrors could find application in the telecommunications field. The operating principles of the MEMS mirror actuators could also be useful for other MEMS applications where a large number of parts need to be configured using only a few electrical drive lines.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The spectral resolution of a spectrometer is a function of many instrument parameters, such as entrance aperture size, grating size and period, detector element size, and optical aberrations. Although often not the limiting factor, a smaller detector element can yield higher resolution. Typical arrayed detector elements are 14-50 µm in width; when coupled with a typical ⅛ m compact spectrograph and 600 line/mm grating, resolution better than 2 nm is achievable at 1100 nm center wavelength. Similar performance is expected when replacing the conventional spectrometer's detector array with a programmable mirror array and a detector.

Several mechanisms are commonly used for MEMS actuators: thermal, electrostatic, magnetic, and piezoelectric. Thermal and magnetic actuators are unsuitable for low power operation unless the devices can be configured and held into a state with another means, and piezoelectric actuators commonly use non-standard fabrication materials (e.g. lead) not allowed in many MEMS or IC fabrication facilities. The present invention relies on electrostatic mechanisms for the MEMS actuators.

In a particular embodiment, the mirror devices of the present invention were designed and fabricated using a silicon nitride structural-layer MEMS process, summarized herein. A silicon nitride passivation layer and Ti/Au are deposited on a silicon wafer. The Ti/Au is then patterned with a metal0 mask that defines lower-layer electrical routing and high-adhesion anchor locations for the latter structural devices. A sacrificial polymer is then deposited and patterned using photoresist and developer, creating anchor points through the polymer film. A Au/Ti metal1 film is then sputtered atop the wafer, conformally filling into the anchor holes. The areas where the anchored metal1 is atop metal0 gold creates a strong Au—Au interface. However, since gold does not adhere well to silicon nitride, structures anchored to the exposed passivation layer have poor adhesion. This allows the design of vertically constrained dimple points the full depth of the sacrificial layer without a separate masking step. A holemetal1 step is used to electrically isolate features (eg. for making electrical switches, routing, etc.), and also to create unmetallized submicron indentations into the sacrificial layer, which can be used to prevent parts from sticking down when actuated. A layer of structural silicon nitride is grown by low-temperature (250° C.) Plasma Enhanced Chemical Vapor Deposition (PECVD), followed by a sputtered Ti/Au metal2 film. The metal2, structure, and metal1 films are then patterned and etched by a single mask, leaving a stacked mechanical structure with electrically conductive metal on both surfaces of the structures. The exposed reflective metal2 Au on top of all structures is used for mirrors in this infrared spectrometer application, and can also be used for a metal-metal lid-sealing area for final packaged devices. The sacrificial polymer is removed by isotropic $O_2$ plasma etching. In a particular embodiment, the array utilizes the following non-optimized layer thicknesses: metal0=0.3 µm, sacrificial polymer layer=2.4 µm with unmetalized indentations=0.6 µm into the polymer, and the metal1 (0.3 µm)+silicon nitride (1.4 µm)+metal2 (0.2 µm) structure stack=1.9 µm.

The electrostatic forces are relatively weak, decreasing with the square of the electrode distance. Therefore, to increase the mirror deflection angle, a levered cantilever-mirror actuator is utilized. In such structures, a lever is fabricated using an electrostatically actuated cantilever connected to a mirror through a flexible hinge structure. Small displacement of the cantilever tip (up to the sacrificial material thickness) can produce a larger out-of-plane angular mirror change caused by a fulcrum point designed between cantilever tip and mirror. The advantage of this method is that no sliding hinges are required, and a relatively large out-of-plane mirror angle can be achieved with moderate drive voltages. For spectrometer applications, only a few degrees angular movement of the mirrors is needed to spatially separate portions of the spectrum. For example, an f/22 optical spectrograph would require only a 2.6 degree mirror movement to spatially separate the wanted and unwanted portions of the output spectra.

Figure 2:
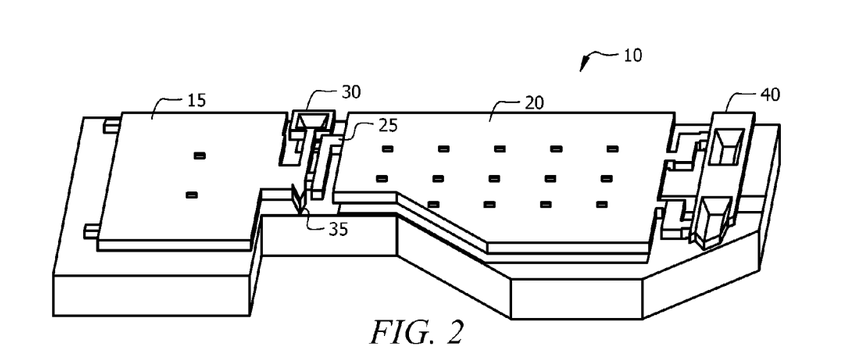
FIG. 2 is an illustration of a solid model of pop-up mirror structure showing hinged cantilever and mirror structures and various design features in accordance with an embodiment of the present invention.

In accordance with a particular embodiment of the present invention, the array includes a ground plane under the mirrors to prevent stray charges from causing spurious electrostatic forces, which can pull the electrically grounded mirror downward. Additionally, submicron indentations are included at several points under each cantilever to prevent metal-metal contact welding, and to create a low contact area to reduce the chance of stiction which can cause the parts to stay stuck down even after turning off the actuation voltages. In an additional embodiment, vertically-constrained dimple fulcrum points are included. This dimple was found to be beneficial since unwanted vertical displacement of the torsion hinge reduces the maximum angular magnification of the cantilever structure. A solid model of the micro mirror 10 of the present invention showing various design features of a cantilever-mirror element is accordance with an embodiment of the present invention are illustrated in FIG. 2 in which an electrostatically actuated cantilever 20 is coupled to a micro mirror 15 through a flexible hinge 25 and/or a torsion hinge 30. In this particular embodiment a dimple fulcrum is implemented in the torsion hinge 35. The cantilever further includes a cantilever attachment 40.

Figure 3A:
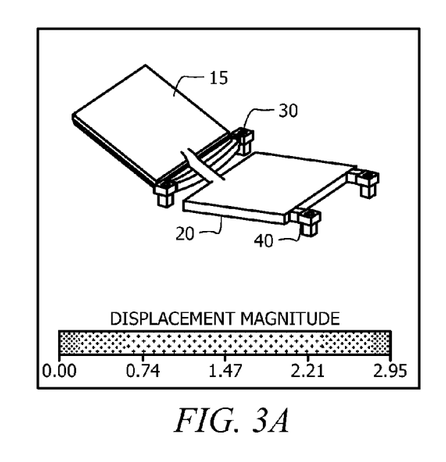
FIG. 3 is a series of illustrations showing simulated deflection of sample test structures using a constant force applied to the cantilever top surface and three fulcrum structures in accordance with various embodiments of the present invention: (A) single torsion hinge=2.8 degrees deflection, (B) torsion and flexible hinge structures=5.9 degrees, and (C) flexible hinge structure with a vertically-constrained dimple point=7.8 degrees.
Figure 3B:
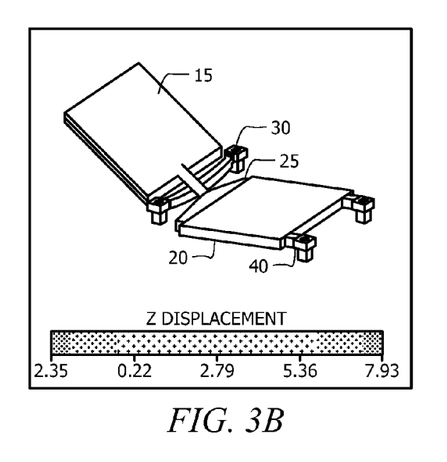
Figure 3C:
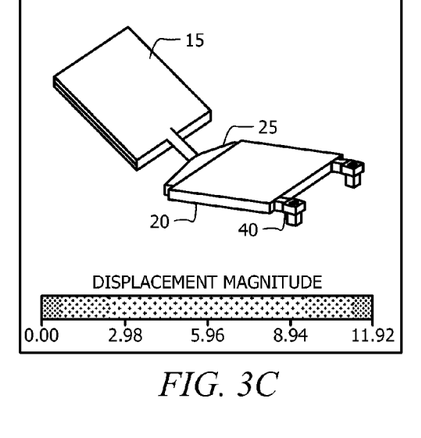

FIGS. 3A-C show a comparison of Finite Element Analysis (FEA)-simulated mirror angular displacement for the case of a simulated electrostatic pressure applied to the 100×88 µm cantilever, for designs with: 3A) a single torsion hinge=2.8 degrees, 3B) torsion and flexible hinge structures=5.9 degrees, and 3C) flexible hinge structure with a dimple fulcrum point=7.8 degrees. A constant average pressure (0.1 MPa) was applied to the surface of the cantilever in the simulations, instead of performing coupled electrical-mechanical simulations. This allowed comparison of various hinge designs while reducing simulation time. In the figures, the vertical dimension is exaggerated to more clearly show displacement. It can be noted that in the designs without the dimple fulcrum point (FIGS. 3A, 3B), work is undesirably performed to bend the torsion beam downward. This vertical deflection also reduces the useful displacement of the lever arm, so the maximum angle achievable on the mirror before the cantilever snaps down will be reduced. Indeed, the force applied in FIG. 3B already exceeds the force required to push the corners of the upper plate to the substrate (i.e. the tip of the cantilever is unrealistically pulled below the surface of the wafer).

In accordance with the present invention, it is desirable to position a large number (N) of mirrors into one of two states (i.e. rotated up or remaining flat) so the incident spectrum can be selectively deflected onto a detector. In the simplest layout, the designer could use one electrode per mirror to configure each. However, if the number of mirrors is large (for example 1024) and on-chip drive electronics and routing are unavailable, the task of connecting the individually addressed mirror array to external electronics becomes a wire-bonding (or ball-grid connect) challenge. Additionally, since electrostatic devices typically operate at voltages above CMOS-levels, amplification circuitry is usually required, adding to the impracticality of this solution. Thus, it is desired to develop a method to reduce the number of connections and amplifiers required to configure the mirror array. The electrostatic drive principle in accordance with the present invention is summarized in the following text, and a solution for reducing the number of driving lines based on the principles is presented.

Figure 4A:
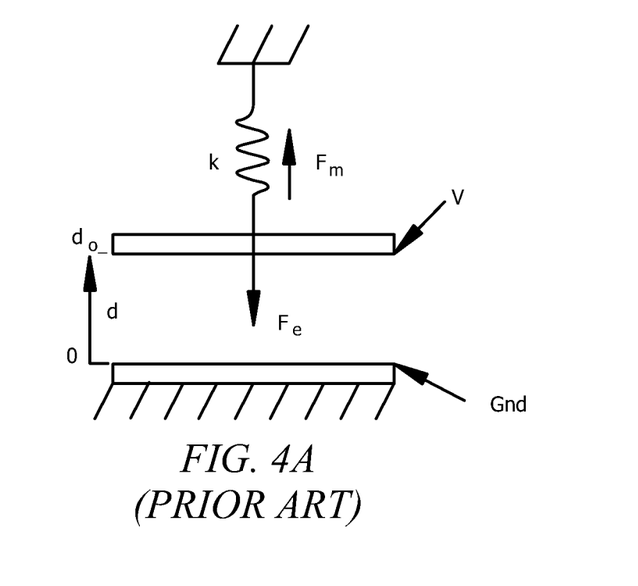
FIG. 4 is a series of illustrations showing an example of force versus electrode gap for (A) simplified moveable parallel plate capacitor structure with initial gap $d_o$ and voltage V applied across the plates, for the instances: (B) single lower electrode with V=30V, (C) 3 lower electrodes with 50%, 30% and 20% of the area of case (B), and V=40V.
Figure 4B:
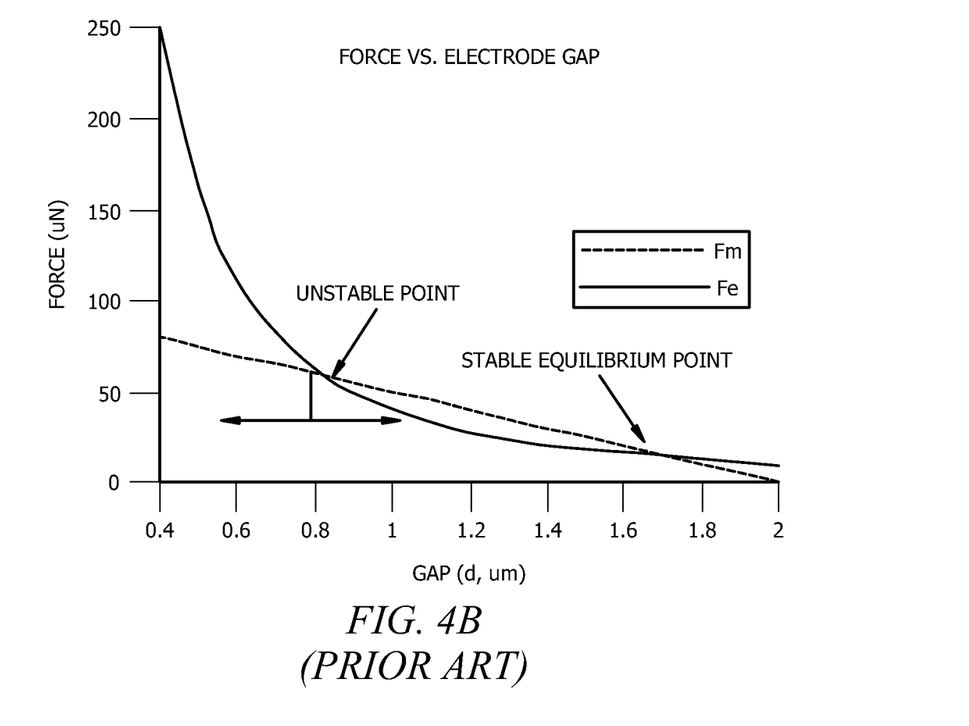

Electrostatic MEMS actuators have been used in a wide variety of devices. They operate on the principles of electrostatics wherein a force is exerted on oppositely charged parallel plates. As illustrated in FIG. 4A, upon application of a voltage between the plates, the less constrained moveable plate is pulled toward the other by an electrostatic force, $F_e$:

$$F_e = \epsilon A / 2d^2 V^2 \tag{1}$$

where $\epsilon$ is the permittivity of the (air) gap, d is the plate spacing, A is the electrode area, and V the applied voltage. If the moveable electrode plate is attached to a fixed structure through a spring, the direction of the restoring mechanical force ($F_m$) is opposite that of the electrostatic force and proportional to the displacement:

$$F_m = k(d_o - d) \tag{2}$$

where $d_o$ is the initial plate position and k is the spring constant (related to the Young's modulus of the material and the moment of inertia of the plate). The equilibrium position occurs when $F_m$ and $F_e$ are equal, or when $F_e$ exceeds $F_m$ and the plates are pulled into contact with each other. It should be noted that $F_e$ is proportional to the inverse square of the electrode gap, whereas $F_m$ is linearly proportional to the reduction in inter-electrode gap from the initial position. This is illustrated in the hypothetical example shown in FIG. 4B (100×100 µm plates, initially separated by a distance $d_o=2$ µm, with 30V applied, k=50 µN/µm). The moveable plate is pulled downward from d=2 µm by the larger electrostatic force, until the equilibrium gap (d~1.7 µm) is reached because $F_e = F_m$. The solution near 0.8 µm is an unstable solution, since a small increase in gap causes the larger mechanical force to continue increasing the plate separation until the stable solution near 1.7 µm is reached. However, if the initial inter-electrode gap can be reduced below the second intersection point at d~0.8 µm, then $F_e$ exceeds $F_m$, and the equilibrium point will be at gap d=0 (i.e. the plates are in contact). This dual-equilibrium point operation results in a hysteresis effect that can be used to the designer's advantage, as discussed below.

Figure 4C:
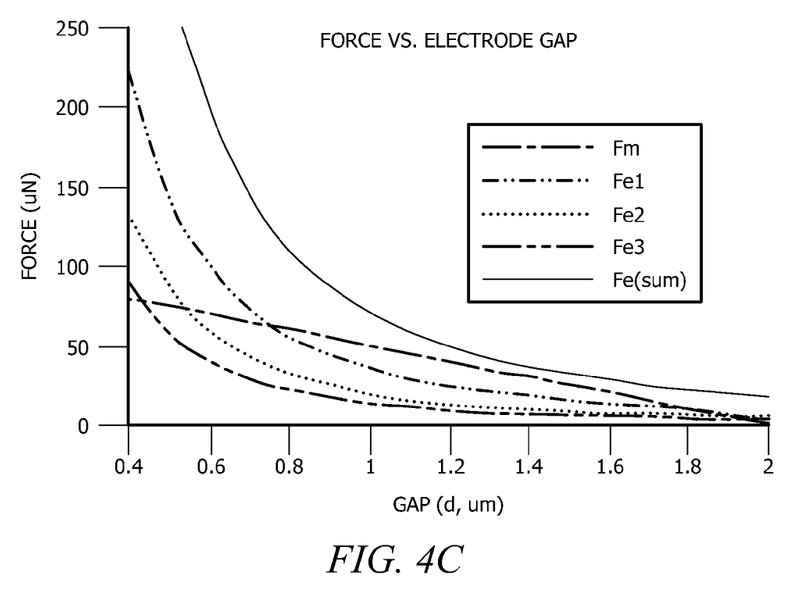

If instead of using a single fixed electrode under each element of the electrostatic actuator array, three electrodes are used under each actuator, a reduction of the total number of driving lines can be realized. When a voltage is applied to an electrode, each generates an electrostatic force on the moveable electrode, as per Eq. (1). If a sufficient voltage is applied, the sum of the forces ($F_{e(sum)}$) can be large enough to pull down the moveable plate to the fixed electrode, as illustrated in FIG. 4C. The figure shows an example where the three electrode areas are 50%, 30%, and 20% of the area of the 100×100 µm plate used in FIG. 4B, and V=40V. If fewer than all three electrodes have voltage applied to them, the pull-in force is not exceeded, and the upper plate will deflect slightly to a position over the lower electrode. If, however, 40V is applied to all three electrodes, $F_{e(sum)}$ will always exceed $F_m$, causing the moveable plate to pull down to d=0. After being pulled down, the plate can be held in place by keeping just a single electrode active, due to the electrostatic hysteresis effect mentioned previously. We can designate one of the electrodes (for example, the one resulting in $F_{e1}$) as a hold-down electrode, and the other two electrodes as pull-down electrodes.

Figure 5:
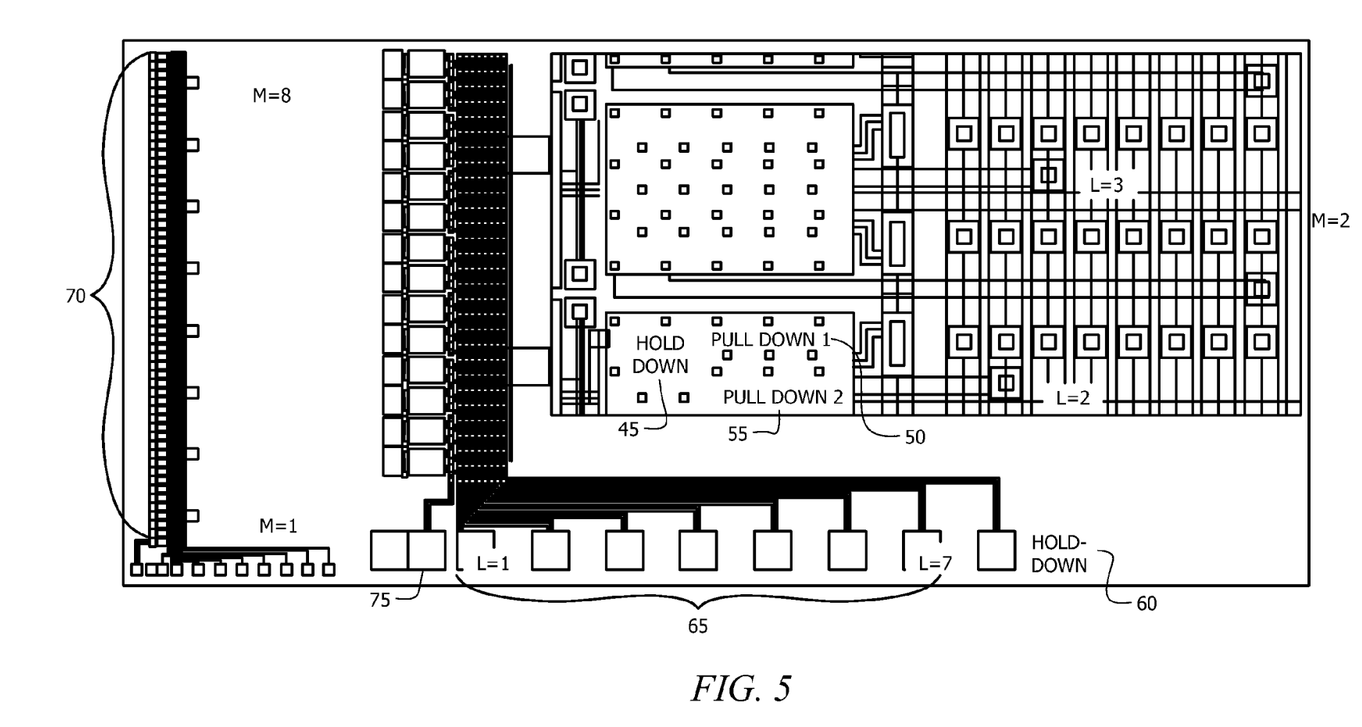
FIG. 5 is a diagram for a design for addressing 56 mirrors with 17 electrodes by using the electrostatic hysteresis effect and electrode multiplexing

With reference to FIG. 5, the method for the reduction of driving lines in accordance with the present invention is described. In this embodiment, the micro mirror includes a hold-down electrode 45, a first pull-down electrode 50 and a second pull-down electrode 55 as previously described. In a particular embodiment, a single line is designated as running under an area of all actuators as the hold-down signal 60. The pull-down lines are then configured similar to a cross-point matrix used in memory cells. One of 'L' vertical bus lines 65 is designed in an area under each of a group of 'L' actuators, and repeated in 'M' groupings 70. Each one of 'M' horizontal lines are designed in an area under one entire group of 'L' actuators. There is then a unique pair of 'L' and 'M' lines that will designate each actuator. Thus to configure the actuator array with any specified set of actuators down, the controller can maintain a voltage to the hold-down signal 60, then sequentially choose the combinations of electrodes L 65 and M 70 to pull down these actuators. The hold-down electrode serves to keep the already-programmed actuators in their pulled-down state, and can be turned off to allow resetting of the array for re-programming. An additional ground signal line 75 is coupled to the top of the cantilever.

The total number of electrodes needed to configure L*M actuators is L+M+2 (L+M pull-down electrodes+1 hold-down electrode+1 electrode connected to the top actuator). For the example shown in FIG. 5, with L=7 and M=8, 56 actuators attached to hinged mirrors can be configured with 17 lines, compared to 57 required if one electrode was used per actuator. Only 66 actuators (L=M=32) would be needed to configure 1024 actuators, which is a reasonable number of drive signals out of an ASIC or FPGA in a standard package. Though the current design uses only 2 pull-down electrodes and 1 hold-down electrode under each actuator, additional savings could be realized by using more electrodes (for example, using 3 pull-down electrodes per actuator, just 26 electrodes would be required to configure 512 actuators). There is likely a practical limit to the number of pull-down electrodes, due to fabrication tolerances and minimum design rule spacing.

Several variants of the pop-up mirror devices were fabricated and tested. The design variations included cantilever length (100 µm or 150 µm); straight or Z-shaped cantilever attachment structures; and dimple fulcrum points with flexible hinges, or torsion hinges. Each variation of the current design includes a flexible hinge to reduce the high drive voltage requirements seen in previous designs without the flexible hinges.

For testing the various design styles and verifying the electrostatic multiplexing concept, a Wyko NT3300 white-light interferometer profiler was used to provide non-contact measurements of device topography. The standard instrument base has been modified to act as a probe station and includes a platen to hold several microprobes for applying voltages to the test parts. The system is currently limited to 4 probes at a time. Due to this limitation, the electrostatic pull-down and hold-down testing was performed on individual mirrors, instead of the full multiplexed array shown in FIG. 5.

In the experimental results, the pop-up mirror styles with 150 µm cantilevers had a lower pull-in voltage compared to 100 µm cantilevers, due to the larger electrostatic force generated by the former. However, the maximum pull-in mirror deflection angle was greatest (4.5°, at 80V) for the devices with 100 µm cantilevers, fulcrum dimples, and straight cantilever attachments. The design with 150 µm long cantilevers, fulcrum dimples, and straight cantilever attachments achieved only a 3.3° mirror deflection (at 65V). The deflection angle reduction is apparently due to slightly more bowing up of the less-rigid longer cantilever near the fulcrum point. The style with 150 µm long cantilevers, fulcrum dimples and Z-shaped cantilever attachments produced a 3° mirror deflection at 50V. The largest deflection angle for the styles with only a torsion bar (no fulcrum dimple) was only 1.3°, and was limited by undesirable vertical deflection of the torsion bar.

The electrostatic multiplexing was verified by applying voltage to the three bottom electrodes, combined or independently. Since the hold-down electrode is toward the end of the cantilever (see FIG. 5), and has the largest moment arm (for styles without fulcrum dimple hinges), it had the greatest effect. For the 150 µm long cantilever style, with Z-shaped cantilever attachments with torsion and flexible hinges, the pull-in voltage for the hold-down electrode was 65V. Because of the presence of the 0.6 µm deep indentations under the cantilever, the cantilever-electrode gap cannot be less than 0.6 µm, and there is a finite voltage (50V) where the hold-down force no longer keeps the pulled-down cantilever down. Thus, operating at 60V, within this usable hysteresis range (50-65V), the pull-down electrodes were then applied. As the Pull-down1 electrode was applied, it was noted the pull-in voltage was 20V. Releasing the mirror, then operating slightly below pull-in, at $V_{hold-down}$=60V, $V_{pull-down1}$=19V, the cantilever bowed down, but did not pull in. When 60V was applied to the Pull-down2 electrode, the cantilever snapped down. While keeping the hold-down electrode at 60V, both pull-down electrodes could be set to 0V, and the cantilever maintained its pulled-down state. Turning the hold-down voltage below 50V released the cantilever, to allow re-programming of its state. These results above are summarized in Table I, and show the multiplexing concept as viable.

Table I. Sequential Operation of Multiplexer-Actuated Mirrors

TABLE I

Sequential operation of multiplexer-actuated mirrors

| Time. | Voltage at hold down electrode | Voltage at Pull down1 electrode | Voltage at Pull down2 electrode | Top electrode | Result |
|---|---|---|---|---|---|
| 1 | 0 | 0 | 0 | Gnd | Mirror home position |
| 2 | 65 | 0 | 0 | Gnd | Pulls down |
| 3 | 50 | 0 | 0 | Gnd | Releases back to the home position |
| 4 | 60 | 20 | 0 | Gnd | Pulls down |
| 5 | 60 | 0 | 0 | Gnd | Remains held down |
| 6 | 50 | 0 | 0 | Gnd | Releases back to the home position |
| 7 | 60 | 19 | 60 | Gnd | Pulls down |
| 8 | 60 | 0 | 0 | Gnd | Remains held down |

Time. Voltage at Voltage at Voltage at Top Result hold down Pull down1 Pull down2 electrode electrode electrode electrode 0 0 0 Gnd Mirror home position
65 0 0 Gnd Pulls down
50 0 0 Gnd Releases back to the home position
60 20 0 Gnd Pulls down
60 0 0 Gnd Remains held down
50 0 0 Gnd Releases back to the home position
60 19 60 Gnd Pulls down
60 0 0 Gnd Remains held down Experimental results show that, the mirror arrays with dimpled fulcrum points resulted in larger angular movement of the pop-up mirrors than versions with a torsion bar fulcrum point. The flexible hinge reduced the pull-in voltage from previous fabricated devices. The addition of Z-shaped cantilever attachment points was beneficial for reducing actuation voltage. Further modification to include an even more compliant attachment mechanism could likely further reduce the actuation voltage. Because bowing of the cantilever near the fulcrum point was noted, an optimized design of flexible hinge and fulcrum dimple could provide a larger angular movement, if needed. Reducing the depth of the indentation features under the cantilever would also increase the maximum angular movement of the mirror, since the smaller cantilever-electrode gap would produce a larger force; it would additionally reduce the voltage required to maintain the hold-down state. This change could be easily made in the fabrication process by reducing the etch time at the indentation formation step. For spectrometer applications, the current angular movements are likely acceptable. For example, an f/22 optical spectrograph would require only a 2.6 degree mirror movement to spatially separate the wanted and unwanted portions of the output spectra. If two optical spectral bands need to be simultaneously measured, the mirror arrays can be abutted back-to-back, with each array redirecting the light of interest onto a separate detector.

The multiplexing concept, where electro-mechanical hysteresis is used and several electrodes contribute electrostatic force, can be used to actuate and hold down arrays of electrostatic actuators. Devices with multiplexing electrode interconnection have been designed, and a significant reduction in the number of actuation lines has been realized, compared to the 1-electrode-per-mirror configuration. Because the moment arm of the Pull down2 electrode (FIG. 5) is small compared to the hold-down and other pull-down electrodes, a modified design incorporating both pull-down electrodes under the cantilever from attachment point to hold-down electrode would be beneficial to equalize their electromechanical contribution.

It is anticipated the switching speed of these devices would be approximately the same, allowing a complete spectrometer array reconfiguration time of less than 1 second.

A MEMS mirror array for use in optical spectrometers has been presented. A scheme for reducing the number of drive electrodes to a practical number has been devised and tested. The scheme includes a hold-down electrode to maintain the programmed state, and two (or more) pull-down electrodes to additively achieve pull in of the electrostatic cantilever. If only two of the three electrodes are applied, pull-in is not achieved. The implemented control methods are useful for the stated application, and potentially for others where configuration of arrays of electrostatic parts is required.

In a particular embodiment, the devices were fabricated using a silicon nitride surface micromachining process resulting in reflective gold mirror surfaces. Low-adhesion Au-to-silicon nitride dimples were used in the designs to prevent vertical deflection of the fulcrum point of the cantilever-mirror levered structure. This was shown to produce a larger mirror movement compared to the designs using a more conventional torsion bar fulcrum point.

Additional reduction of the drive voltage and increased mirror scan angle could be achieved through the use of thinner structural silicon nitride, more compliant cantilever beam attachment features, or reduced feature dimensions. Use of alternate materials (for example, aluminum) could allow the mirror array designs to be used in visible optical spectrometer applications as well.

REFERENCES

S. Kedia, S. Samson, A. Farmer, M. C. Smith, D. Fries, S. Bhansali, "Handheld interface for miniature sensors," SPIE International Symposium of Smart Materials, Nano- and Micro-Smart Systems v. 5649 p. 241-252, 2004.

Alan G. Marshall ed., *Fourier, Hadamard, and Hibert Transforms in Chemistry*, New York: Plenum Press, 1982.

Polychromix. Wilmington, Mass. 01887. http://www.polychromix.com.

E. Wagner, B. Smith, S. Madden, J. Winefordner, and M. Mignardi, "Construction and evaluation of a visible spectrometer using digital micromirror spatial light modulation," Applied Spectroscopy, v. 11, p. 1715-1719, 1995.

K. I. Tarasov, *The Spectroscope*, New York: John Wiley & Sons, p. 77-81, 1974.

S. Samson, R. Agarwal, S. Kedia, W. Wang, S. Onishi, and J. Bumgarner, "Fabrication processes for packed optical MEMS devices," Proc. ICMENS 2005 Banff, Alberta, Canada, p. 113-118, 2005.

D. Lopez, F. Pardo, V. Aksyuk, M. Simon, H. Shea, D. Marom, D. Neilson, R. Cirelli, F. Klemens, W. Mansfield, L. Fetter, E. Bower, J. Miner, and T. Sorsch, "MEMS mirror array for a wavelengths selective 1×K switch," Proc. SPIE Smart Sensor, Actuators, and MEMS, v. 5116 p. 445-455 2003.

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A reconfigurable microelectromechanical (MEMS) micromirror array system capable of deflecting incident light onto or away from a detector, the micromirror array comprising:
   a plurality of electrostatically-actuated cantilevers;
   a plurality of mirrors, each of the plurality of mirrors coupled to one of each of the plurality of electrostatically-actuated cantilevers through at least one hinge element;
   a plurality of fixed hold-down electrodes, one of each of the plurality of fixed hold-down electrodes positioned on the substrate and underneath one of each of the plurality of cantilevers; and
   a plurality of fixed pull-down electrodes, at least two of each of the plurality of fixed pull-down electrodes positioned on the substrate and underneath one of each of the plurality of cantilevers;
   a hold-down signal line coupled to each of the plurality of fixed hold-down electrodes;
   a plurality of first pull-down signal lines, each of the plurality of first pull-down signal lines coupled to one of each of the at least two fixed pull-down electrodes and a plurality of second pull-down signal lines coupled to another of each of the at least two fixed pull-down electrodes, the first plurality of pull-down signal lines and the second plurality of pull-down signal lines configured in a cross-point matrix such that a unique pair of first pull-down signal lines and second pull-down signal lines is associated with each of the plurality of cantilevers.

2. The system of claim 1, wherein the hinge element is a flexible hinge.

3. The system of claim 1, wherein the hinge element is a torsion hinge.

4. The system of claim 1, wherein the hinge element is a flexible hinge and a torsion hinge.

5. The system of claim 3, further comprising a vertically-constrained dimpled fulcrum point aligned with the torsion hinge.

6. The system of claim 1, further comprising a ground plane positioned under the plurality of mirrors to prevent stray charges from causing spurious electrostatic forces.

7. The system of claim 1, further comprising a plurality of submicron indentations included at several locations under each of the plurality of cantilevers.

8. The system of claim 1, further comprising a micro actuator selection controller coupled to the plurality of hold-down signal lines and a voltage source.

* * * * *